United States Patent
Maiuzzo et al.

(10) Patent No.: US 9,584,350 B1
(45) Date of Patent: Feb. 28, 2017

(54) ELECTRONIC JAMMING SYSTEM AND METHOD

(75) Inventors: Michael Anthony Maiuzzo, Forest, VA (US); Ronald Sones, Gladstone, VA (US)

(73) Assignee: Liberty University, Lynchburg, VA (US)

( * ) Notice: Subject to any disclaimer, the term of this patent is extended or adjusted under 35 U.S.C. 154(b) by 1219 days.

(21) Appl. No.: 12/856,079

(22) Filed: Aug. 13, 2010

Related U.S. Application Data

(60) Provisional application No. 61/233,958, filed on Aug. 14, 2009.

(51) Int. Cl.
*H04K 3/00* (2006.01)
*H04L 27/26* (2006.01)
*H04L 1/00* (2006.01)

(52) U.S. Cl.
CPC .......... *H04L 27/2601* (2013.01); *H04L 1/004* (2013.01); *H04L 27/2626* (2013.01)

(58) Field of Classification Search
CPC . H04L 27/2601; H04L 1/004; H04L 27/2626; H04L 27/2647
USPC .......................................................... 455/1
See application file for complete search history.

(56) References Cited

U.S. PATENT DOCUMENTS

| | | | | |
|---|---|---|---|---|
| 6,195,529 | B1* | 2/2001 | Linz | H04K 3/28 342/14 |
| 7,136,659 | B2* | 11/2006 | Khushu | H04W 4/02 455/456.1 |
| 7,630,408 | B2* | 12/2009 | Sriram | H04B 1/70735 370/442 |
| 8,010,038 | B2* | 8/2011 | Valentine | H04K 3/42 102/401 |
| 2003/0012268 | A1* | 1/2003 | Doetsch | H04B 1/7087 375/149 |
| 2009/0245338 | A1* | 10/2009 | Jonsson | 375/224 |
| 2010/0289688 | A1* | 11/2010 | Sherman | H04K 3/228 342/16 |
| 2012/0154213 | A1* | 6/2012 | Bull | G01S 5/0215 342/357.25 |

* cited by examiner

Primary Examiner — Ajibola Akinyemi
(74) Attorney, Agent, or Firm — Banner & Witcoff, Ltd.

(57) ABSTRACT

An electronic jamming circuit and method used to place a protective area around a person or vehicle so that an explosive device cannot be triggered are described. A wideband code division multiple access (WCDMA) device in proximity to an explosive device is prevented from being triggered by a WCDMA communication by disruption of the ability of the WCDMA device to synchronize with, and thus cannot decipher, the communication. The jammer device may operate by forcing timing circuits in the WCDMA device to lock onto a jamming signal.

19 Claims, 4 Drawing Sheets

ELECTRONIC JAMMING SYSTEM AND METHOD

CLAIM OF PRIORITY

This application claims priority to the provisional application entitled, "Electronic Jamming System and Method" filed Aug. 14, 2009, U.S. Application Ser. No. 61/233,958, the contents of which are incorporated by reference in its entirety.

FIELD OF THE DISCLOSURE

The present disclosure relates generally to electromagnetic jamming devices and more particularly to electronic jamming devices for use in protecting against explosive device triggers, such as wideband code division multiple access devices.

BACKGROUND

Recently, there has been an increased interest in saving lives by protecting soldiers and peace keeping troops from being targeted by explosive devices. See, for example, U.S. Pub. App. No. 2008/0129600, filed Dec. 5, 2005, and entitled "Methods and Systems for Locating Actuators for Improvised Explosive Devices," U.S. Pub. App. No. 2008/0083320, filed Oct. 5, 2006, and entitled "System, Method, and Apparatus for Countering Improvised Explosive Devices (IED)," U.S. Pat. No. 5,287,539, filed Feb. 21, 1990, and entitled "Interdiction Program Denial System for Jamming Audio and Video Signals," U.S. Pat. No. 7,346,334, filed Jun. 30, 2005, and entitled "Method of Preventing Detonation of a Mobile-Terminal-Triggered Explosive Device," U.S. Pat. No. 7,138,936, filed Mar. 18, 2005, and entitled "Method and Apparatus for Protecting Personnel from RF-Triggered Explosive Devices (RTED) Using Ultra-Wideband (UWB) Transmission," U.S. Pub. App. No. 2008/0084345, filed Jul. 17, 2007, and entitled "Broadband Multi-Channel Detector with Signal and Jamming Discrimination," U.S. Pub. App. No. 2006/0164283, filed Mar. 17, 2006, and entitled "Method, System and Apparatus for Maximizing a Jammer's Time-On-Target and Power-On-Target," and U.S. Pat. No. 7,296,503, filed Jan. 23, 2006, and entitled "Method and Apparatus for Neutralizing Improvised Explosive Devices and Landmines and Mobile Unit for Performing the Method." While various remote control jamming devices are known, heretofore, they have not been particularly effective in actual practice in the field.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present disclosure describe an electronic jamming circuit and method which places a protective area around a person and/or vehicle so that an explosive device cannot be triggered. Such an electronic jamming circuit and method may include an electronic jammer device configured to place a protective volume around its holder so that an explosive device set to be triggered by a wideband code division multiple access (WCDMA) communication to a WCDMA device in proximity to the explosive device is prevented from being triggered by said WCDMA communication by disruption of the ability of the WCDMA device to synchronize with, and thus cannot decipher, the communication. The jammer device may operate by forcing timing-dependent circuits in the WCDMA device to lock onto a jamming signal.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments. It is to be understood that other embodiments may be utilized and structural and functional modifications may be made without departing from the scope of the disclosure.

Figure 1:
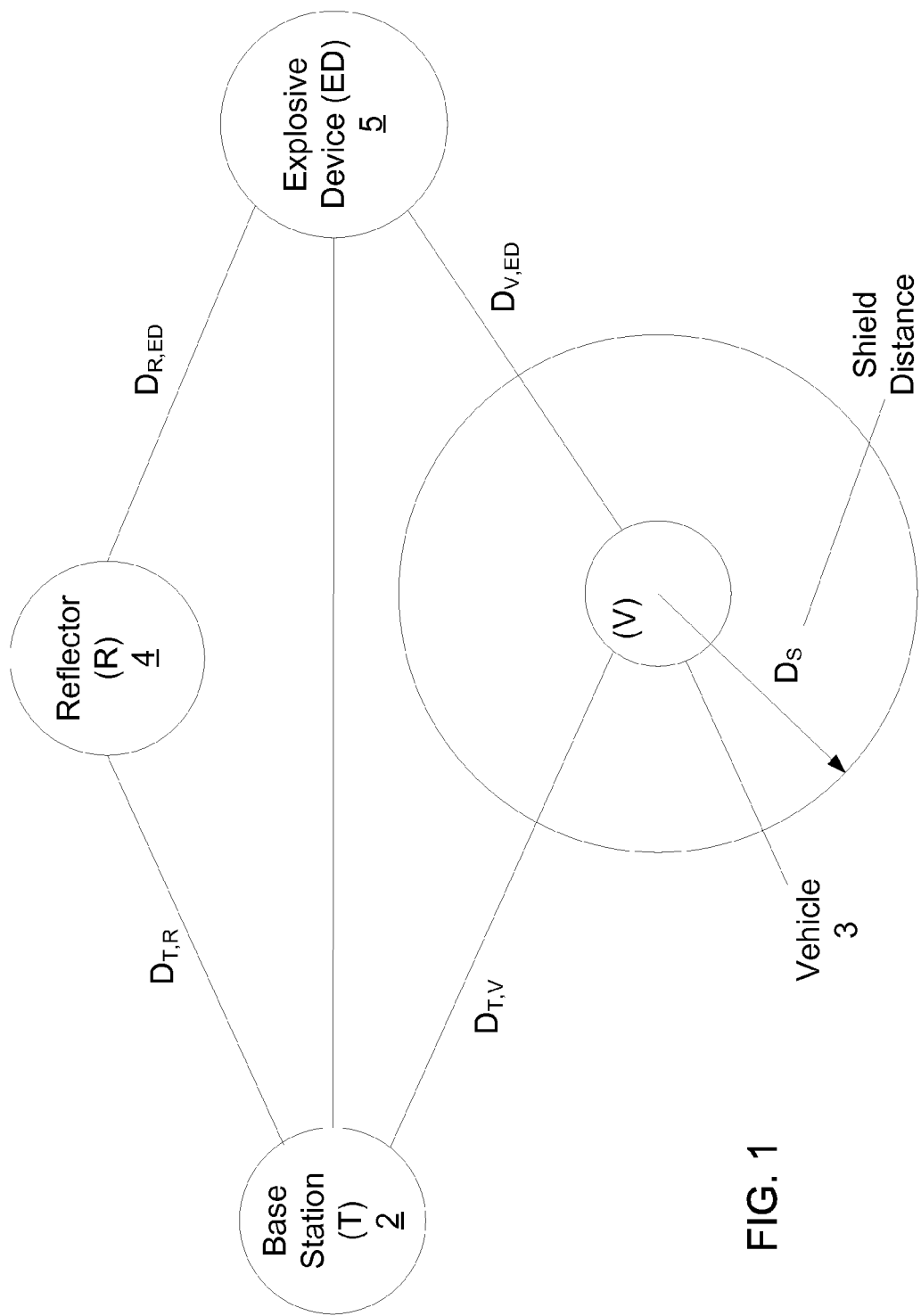
FIG. 1 illustrates a block diagram of an example embodiment of a jamming system in accordance with at least one aspect of the present disclosure.

Referring to FIG. 1, an illustrative jamming device for wideband code division multiple access (WCDMA) communication is described. A wireless network 1 includes a base station 2 for outputting WCDMA signals to various attached receivers, such as cell phones, smart phones, pagers, and/or other electronic computing device. The outputted WCDMA signals may be dispersed across wireless network 1 to persons and/or vehicles 3 and/or impacted and reflected off buildings, hills, and other devices and/or structures, such as reflector 4. The outputted WCDMA signals eventually may arrive at a receiver which may be included in an explosive device 5.

The transmission of the WCDMA signal between base station 2 and explosive device 5 may vary in timing and power depending on one or more factors. Such factors include a distance between base station 2 and explosive device 5, a distance between base station 2 and a receiver, such as vehicle 3, a distance between vehicle 3 and explosive device 5, and/or a distance between base station 2 and any reflectors 4 which reflect the WCDMA signal. As shown in FIG. 1, a distance between base station 2 and the reflector 4 is denoted as ($D_{T,R}$), a distance between reflector 4 and explosive device 5 is denoted as ($D_{R,ED}$), a distance between base station 2 and vehicle 3 is denoted as ($D_{T,V}$), and a distance between vehicle 3 and explosive device 5 is denoted as ($D_{V,ED}$). All of these various distances may determine various delays in the WCDMA signal and may affect the received power of the WCDMA signal from base station 2 to explosive device 5.

In accordance with one or more features of the present disclosure, as vehicle (V) 3 approaches explosive device 5, vehicle 3 emits a jamming signal, which is emitted from vehicle 3 typically in an omni-directional fashion over an effective distance of a shield denoted as ($D_S$). Eventually, as vehicle 3 moves toward explosive device 5, the shield distance Ds envelopes explosive device 5. As such, base station (T) 2 is not able to transmit an intelligible WCDMA signal to explosive device 5 either directly or in a reflective manner. The WCDMA signal emitted from a jammer device of vehicle 3 may be configured to disrupt an internal timing-dependent signal of the WCDMA receiver included within explosive device 5 and to move the internal time-dependent signal out of synchronization of base station (T) 2 by slightly over powering the base station signal and increasing the incremental delay in the timing signal to drag the WCDMA synchronization out of time as discussed in more detail below with reference to FIGS. 2-4.

Figure 2:
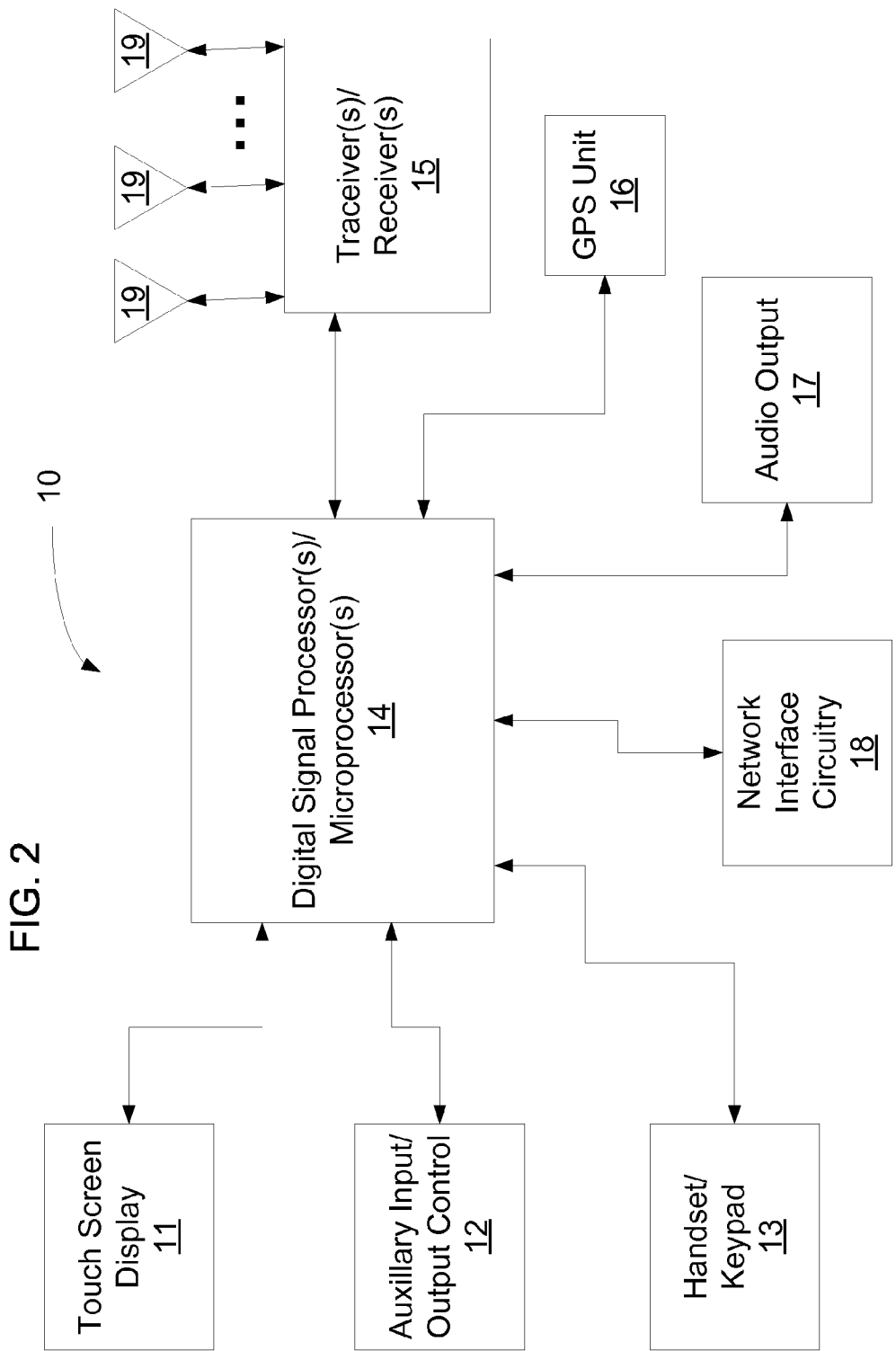
FIG. 2 is a block diagram of an illustrative apparatus for implementing a jamming device for use in a jamming system in accordance with at least one aspect of the present disclosure.

Referring to FIG. 2, a computerized system 10 may be configured for implementing a jamming system in accordance with one or more features of the present disclosure. In one embodiment, one or more digital signal processor(s)/microprocessor(s) 14 may be employed. In the illustrative embodiment of FIG. 2, digital signal processor(s)/microprocessor(s) 14 may be operatively coupled to a touch screen display 11 for user control and input/output of commands, and an auxiliary input/output control 12, which may include an alarm for controlling a vehicle alarm system. Digital signal processor(s)/microprocessor(s) 14 further may be operatively coupled to a handset/keypad 13, a global positioning satellite (GPS) unit 16, an audio output 17, a network interface 18, for example a high speed wireless or wired network interface, and/or transmitter(s)/receiver(s) 15 coupled to one or more antennas 19.

Figure 3:
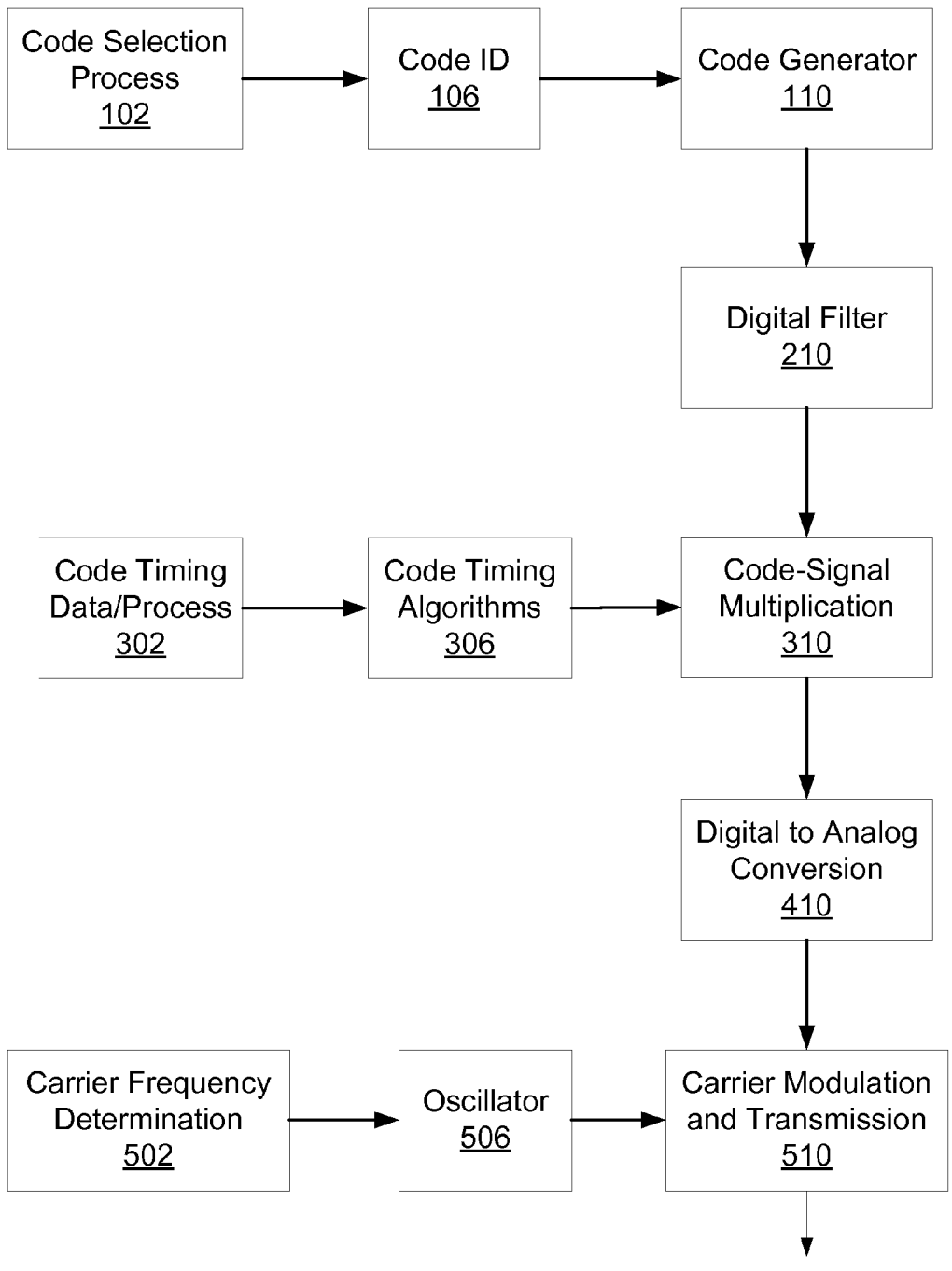
FIG. 3 illustrates an illustrative flow chart of a method embodying a jamming system in accordance with at least one aspect of the present disclosure.
Figure 4:
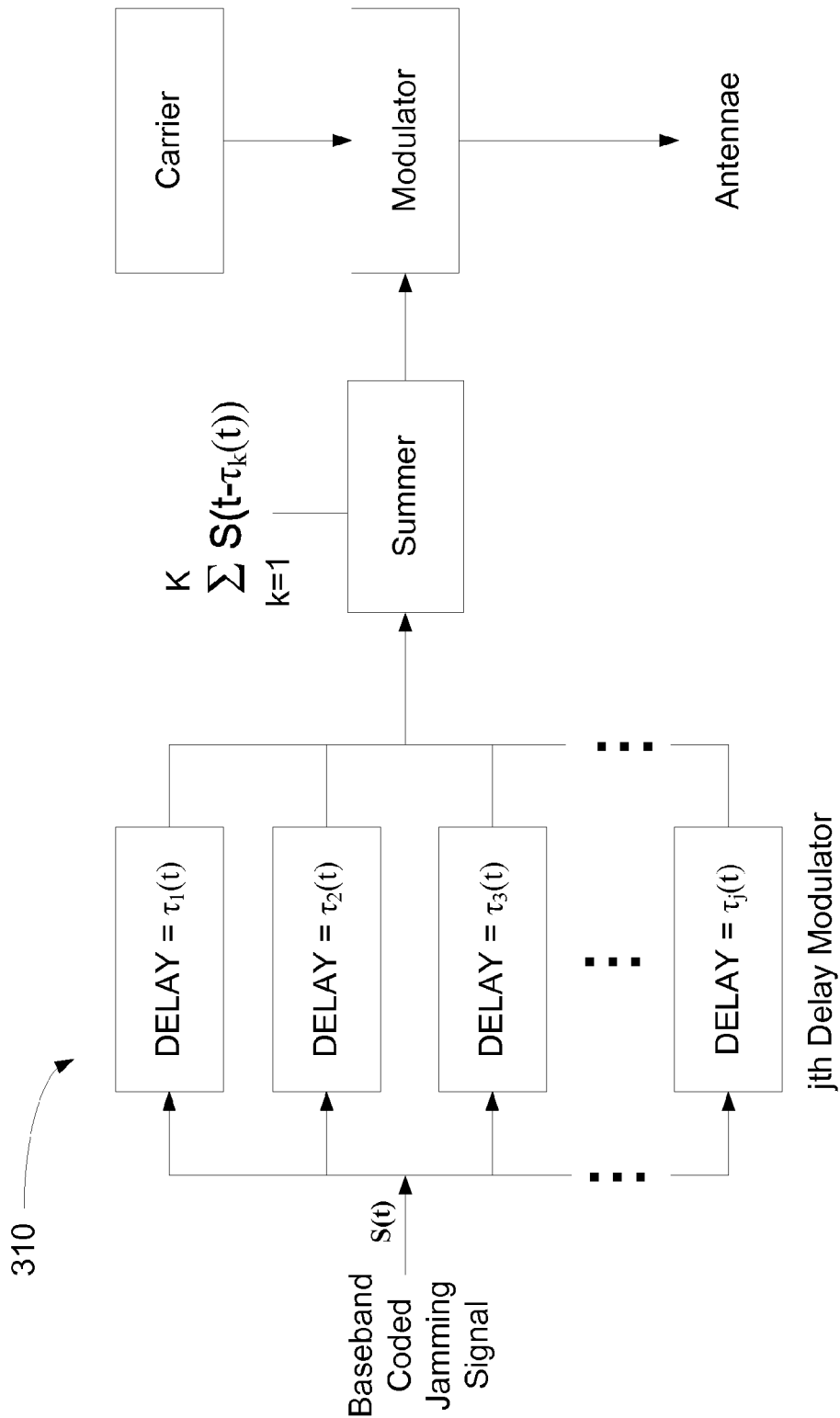
FIG. 4 is a block diagram of an illustrative method embodying the coded-signal multiplication process 310 of FIG. 3 in accordance with at least one aspect of the present disclosure.

Computerized system 10 may implement a jamming system in accordance with the illustrative flow chart shown in FIG. 3 and a digital signal processing algorithm shown in FIG. 4. One or more components of computerized system 10 may be physically located entirely within a vehicle, such as vehicle 3 in FIG. 1. Alternatively, or in addition, one or more components of computerized system 10 may be distributed across a wireless network, such as wireless network 2 in FIG. 1. In distributed embodiments, code selection process 102, shown in FIG. 3 and described in more detail below, may be implemented exterior to a mobile jamming device and may be located in one or more centralized locations about a base station 2. As a vehicle moves through a cell tower zone, timing signals for devices within an area around the vehicle may be jammed. The vehicle may report its current position. This report and/or current position data may trigger a jamming signal for a particular area and/or a shutting down of the timing signals from the base station within a danger zone of the vehicle.

Each base station (T) in a WCDMA system may have one of five hundred and twelve (512) primary scrambling codes and sets of secondary scrambling codes. The overall WCDMA system may include a geographic location for each of the base stations. In this manner, as a vehicle, such as vehicle 3 in FIG. 1, moves around a battlefield, city, town, or other location where an explosive device, such as explosive device 5 in FIG. 1, may be located, digital signal processor(s)/microprocessor(s), such as digital signal processor(s)/microprocessor(s) 14 in FIG. 2, may communicate with a GPS unit, such as GPS unit 16 in FIG. 2, returning precise locations of the vehicle. The vehicle may then enter into an algorithm as shown in FIG. 3 different code identifications 106 in order to enable a jamming system to operate properly.

For example, the vehicle may utilize a database to correlate its current location to a particular code identification, such as code identification 106 described below with respect to FIG. 3, associated with one or more base stations which are active within the location of the vehicle. Alternatively, digital signal processor(s)/microprocessor(s) may receive the signal from the base station using antennae, such as antennae 19 in FIG. 2, through receiver(s), such as receiver(s) 15 in FIG. 2, and may determine the scrambling employed by one or more towers directly from the tower. In this manner, for example, a match filter in a computerized system, such as computerized system 10 in FIG. 2, may be used to match one of the scrambling codes to determine which scrambling code is output by one or more towers adjacent to the computerized system.

Whether the GPS unit is utilized with known tower scrambling codes/locations and/or whether the receiver is utilized to determine dynamically the towers locations, code identifications, and code time of arrival, the algorithm described below with respect to FIG. 3 may be utilized to perform a jamming process either at the vehicle and/or at one or more centralized locations in and/or adjacent to the cell. Having the code time of arrival (TOA) information is advantageous since the jamming likely is most effective when the explosive device (ED) initially detects the jamming signal code TOA essentially/substantially simultaneous with the TOA and slightly more powerful than the coded signal(s) from the tower(s).

While the tower location is not necessary for implementing one or more aspects of the present disclosure, knowing the broadcast radius and signal strength associated with a particular tower is useful information, such that the scrambling codes in a geographic area may be determined. The received codes may contain more than one scrambling code, depending on the overlap in the coverage area of the cell tower. Further, the distance from the base station to the vehicle may be used to determine an anticipated signal strength from direct and reflected signals. This information may be used to change dynamically the power of the jamming signal.

Referring to FIG. 3, an illustrative jammer-coding algorithm in accordance with one or more aspects of the present disclosure is described. The jammer-coding algorithm may be configured in a number of variations. In one illustrative embodiment, the jammer-coding algorithm may select a code using process 102. The code selection process 102 may include comparing the jammer location with a map whereby specific tower-related code(s) are identified for regions of the map. Process 106 may accept input signals derived from the towers, such as via receivers 15 in FIG. 2. Process 106 then may include a bank of digital matched filters (one for each code indicated in process 102) and may select the largest matched filter outputs as the ones indicating correct jamming codes. Because of multipath, each matched filter will be expected to produce multiple peaks, one for each path TOA. One, the largest in a maximum likelihood sense, may be selected as the initial timing for that code.

The code identification may be inputted into a generator in process 110 which uses the code identification information to perform optimum coding of a jamming signal, taking into account the relative distance between adjacent towers. The process may proceed to a digital filter in process 210, before proceeding to a coded-signal multiplication unit in process 310. The coded-signal multiplication unit 310 may be configured to output one or more jamming signals which may be configured to simulate time-varying multipath time of arrival (TOA). Code timing data process 302 may accept input signals derived from the towers, such as via receivers 15 in FIG. 2. Rake reception may be employed that uses matched filter outputs from 106 to set correlation timings in 302. Presumably, the rake reception delays in the unit 106 will approach that of the explosive device (ED) receiver as it approaches the ED. Unit 306 may employ slewing algorithms configured to pick up and move all possible delays within the ED receiver time slot. Code timing algorithms 306 may take into account internal time delays, code repetition intervals, and slewing algorithms that are designed to pull the ED receiver timing sufficiently away from the timing(s) of the received tower(s) signal timing(s). Unit 306 outputs may be used to control delays in unit 310.

The coded-signal multiplication 310 initially may set codes and delays according to the findings of the code identification 106 and code timing 306 units. Unit 310 output may be input into a digital to analog conversion unit in process 410. The digital signal may be converted to an analog signal using digital to analog signal conversion unit 410. The analog signal from digital to analog converter 410 may be input into a carrier modulation and transmission unit in process 510. The carrier modulation and transmission unit 510 also may be configured to utilize a signal from an oscillator in process 506 which may be driven by a carrier frequency determination unit in process 502. If an adjacent tower uses the same carrier frequency, only the code is different. Otherwise two or more carrier frequencies/oscillators/mixers may be needed. The output of the carrier modulation and transmit unit in process 510 may be output to one or more antennae, such as antennae 19 shown in FIG. 2.

An illustrative example of the process of coded signal multiplication unit 310 of FIG. 3 is described in more detail in FIG. 4. For example, the process of coded signal multiplication unit 310 may include an input of a baseband coded jamming signal S(t) into a plurality of finger devices which provide different delays identified as Delay=$\tau_1$(t), Delay=$\tau_2$(t), Delay=$\tau_3$(t), ... Delay=$\tau_j$(t), all input to a summer. The summer may be configured in a variety of manners, but in one embodiment, summer may add each of the coded baseband jamming signals together as shown in FIG. 4. The various delays (DELAY) may be utilized to move the internal timing of a WCDMA signal out of time with a base station signal. As a reference point, it may be assumed that the code from a base station arrives at a vehicle at the same time ±Δ as it arrives at an explosive device. Such a condition is true when a vehicle is in the vicinity, e.g., <$D_S$, of the explosive device. The output signal may then be input to an output device such as a modulator.

Returning to FIG. 4, a modulator may be configured to modulate these signals from the summer on top of a carrier signal and to output the resulting signal to an antennae, such as antennae 19 in FIG. 2, so that the jamming signal may be sent in an omni-directional manner to all locations disposed about the vehicle, such as with respect to the vehicle (V) 3 shown in FIG. 1 for the distance ($D_S$). In illustrative embodiments, the algorithm shown in FIGS. 3-4 may be implemented in digital signal processor(s)/microprocessor(s) 14 of FIG. 2 and/or implemented in discrete logic.

An WCDMA explosive device having a cell phone or pager receiver, may be bound or tied to a particular repeated code which may be repeated approximately every 10 milliseconds. The internal timing of the code within the explosive device receiver typically only receives signals that are within a timing window which it derives from the signal it receives. A jamming device output signal slowly increases the delays of its output signal to slowly take the explosive device receiver out of synchronization with a base station. In order to accomplish this, the jamming device manipulates the code received by a rake receiver within the WCDMA explosive device to slowly increase the delays until it is out of synchronization. For example, where a plurality of finger receivers are in the WCDMA explosive device, the jamming device may be configured such that the signal arriving from the jammer signal is slightly stronger than the signal arriving either directly from the base station or from a reflector. In this way, the rake receiver in the WCDMA explosive device may be tricked into receiving the timing signal from the jamming device within the shield distance and hence taken out of synchronization of the base station.

One common component of a rake receiver in a WCDMA explosive device, such as the explosive device 5 in FIG. 1, is a path searching device. Such a rake receiver may be configured to include a plurality of fingers which may correspond to one path delay of the received signal from a base station. The number of fingers, and the delay associated with each of the respective fingers and a rake receiver, may be allocated based on the output of the path searching device. The operating parameters associated with a path searching device are output so that the rake receiver is synchronized and locked with the signal of the base station. The jamming device of the present disclosure alters the path searching device such that the path searching device is no longer synchronized with the base station but instead becomes increasingly out of synchronization with the base station and becomes synchronized with the delta delays put out by the jamming device utilizing a delay algorithm, such as the delay algorithm described with respect to FIG. 4. In some receivers, the functions of a path searching device and the rake fingers are somewhat physically merged, but the descriptions of features of the present disclosure remain the same.

As the code is delayed by an increasing delta, as illustratively shown in FIG. 4, the internal timing signal of a rake receiver in a WCDMA explosive device increasingly is taken out of synchronization with a base station (T). The explosive device rake receiver then is completely outside of the timing window for receiving the base stations signal, and thus ignores the base station's signal. In this way, an improved jamming device is provided which heretofore has not been known in the art. The jamming device has an advantage of providing substantial additional protection for combat troops in the field where explosive devices are located.

While illustrative systems and methods as described herein embodying various aspects of the present disclosure are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present invention.

The invention claimed is:

1. A method comprising:
   receiving a jamming signal at a path searching device auxiliary to a wideband code division multiple access (WCDMA) device to alter a timing of an internal code used for decoding a received coded signal by a receiver of the WCDMA device; and
   increasing a delay of a timing signal to take the WCDMA device out of synchronization with a base station.

2. The method of claim 1, wherein the receiver of the WCDMA device is a rake receiver that includes the path searching device.

3. The method of claim 2, wherein the path searching device is synchronized with the jamming signal.

4. The method of claim 1, wherein the WCDMA device includes an explosive device.

5. An apparatus for jamming a wideband code division multiple access (WCDMA) signal comprising:
   at least one antenna; and
   a signal processor, operatively coupled to the at least one antenna, configured to:
      determine a code signal of a WCDMA base station, and output a jamming signal configured to alter a timing window, of a WCDMA receiver associated with an explosive device, for receiving the code signal of the WCDMA base station, wherein the jamming signal includes delays to alter the timing window to become out of phase with a timing of the code signal of the WCDMA base station.

6. The apparatus of claim 5, wherein the signal processor is configured to derive the code signal of the WCDMA base station from transmissions from the base station.

7. The apparatus of claim 6, further comprising a jammer receiver configured to measure a time of arrival (TOA) of the code signal from the WCDMA base station at the apparatus.

8. The apparatus of claim 7, wherein the TOA of the code signal from the WCDMA base station at the apparatus is calculated based upon a TOA measurement by a GPS-based device located at continuously-known distances from the apparatus and the WCDMA base station.

9. The apparatus of claim 7, wherein a precise calculation of the TOA of the code signal from the WCDMA base station at the apparatus is transmitted to the jammer receiver.

10. The apparatus of claim 5, wherein the code signal of the WCDMA base station is derived from a database.

11. The apparatus of claim 5, further including a GPS unit, wherein data of a current location received from the GPS unit is used to access a database to derive the code signal of the WCDMA base station.

12. The apparatus of claim 5, further comprising a match filter configured to match one of a plurality of scrambling codes to the code signal outputted by the WCDMA base station.

13. The apparatus of claim 12, wherein the jamming signal is more powerful than the code signal of the WCDMA base station.

14. The apparatus of claim 5, wherein the jamming signal is more powerful than the code signal of the WCDMA base station.

15. A method comprising:
   determining, by a computing device, a code signal of a WCDMA base station; and
   outputting, by the computing device, a jamming signal configured to alter a timing window, of a WCDMA receiver associated with an explosive device, for receiving the code signal of the WCDMA base station, wherein the jamming signal includes delays to alter the timing window to become out of phase with a timing of the code signal of the WCDMA base station.

16. The method of claim 15, wherein the jamming signal is more powerful than the code signal of the WCDMA base station.

17. The method of claim 15, further comprising deriving the code signal of the WCDMA base station from transmissions from the base station.

18. The method of claim 15, wherein the code signal of the WCDMA base station is derived from a database.

19. The method of claim 18, wherein the computing device is not physically connected to the database.

* * * * *